(12) United States Patent
Agnetta

(10) Patent No.: US 12,463,524 B2
(45) Date of Patent: Nov. 4, 2025

(54) AC/DC CONVERTER, DC/AC CONVERTER AND DC/DC CONVERTER AND METHOD OF CONTROL OF THE CONVERTER

(71) Applicant: TERNA S.P.A., Rome (IT)

(72) Inventor: Vincenzo Agnetta, Rome (IT)

(73) Assignee: TERNA S.P.A., Rome (IT)

( * ) Notice: Subject to any disclaimer, the term of this patent is extended or adjusted under 35 U.S.C. 154(b) by 205 days.

(21) Appl. No.: 18/557,904

(22) PCT Filed: Mar. 23, 2022

(86) PCT No.: PCT/IB2022/052659
§ 371 (c)(1),
(2) Date: Oct. 27, 2023

(87) PCT Pub. No.: WO2022/229730
PCT Pub. Date: Nov. 3, 2022

(65) Prior Publication Data
US 2024/0223067 A1 Jul. 4, 2024

(30) Foreign Application Priority Data
Apr. 29, 2021 (IT) .................. 102021000010934

(51) Int. Cl.
*H02M 3/335* (2006.01)
*H02M 1/00* (2006.01)
*H02M 7/758* (2006.01)

(52) U.S. Cl.
CPC ....... *H02M 1/0077* (2021.05); *H02M 1/0074* (2021.05); *H02M 3/33584* (2013.01); *H02M 7/758* (2013.01)

(58) Field of Classification Search
CPC ........ H02M 3/073; H02M 3/10; H02M 3/135; H02M 3/137; H02M 3/28; H02M 3/315;
(Continued)

(56) References Cited

U.S. PATENT DOCUMENTS 7,463,498 B1 * 12/2008 Djekic .............. H02M 3/33592
363/16
8,068,355 B1 * 11/2011 Ikriannikov .......... H02M 3/285
363/16
(Continued)

FOREIGN PATENT DOCUMENTS

EP 2270968 A1 1/2011
JP S56148181 A 11/1981

OTHER PUBLICATIONS

International Search Report and Written Opinion received in PCT Application No. PCT/IB2022/052659, mailed on Jul. 5, 2022.
(Continued)

*Primary Examiner* — Sean Kayes
*Assistant Examiner* — Nusrat Quddus
(74) *Attorney, Agent, or Firm* — Knobbe, Martens, Olson & Bear, LLP

(57) ABSTRACT

AC/DC converter wherein a three-phase trans former (2) comprises a plurality of first secondary windings (4-*a*, 4-*b*, ... 4-*n*) magnetically linked with a first primary winding (3-T), a plurality of second secondary windings (5-*a*, 5-*b*, ... 5-*n*) magnetically linked with a second primary winding (3-S) and a plurality of third secondary windings (6-*a*, 6-*b*, ... 6-*n*) magnetically linked with a third primary winding (3-R). There is provided a plurality of first, second and third reconfigurable connection modules each of which is respectively connected on the input side with a first, a second and a third secondary winding; the outputs of the first reconfigurable connection modules being connected in series to one another, the outputs of the second reconfigurable connection modules being connected in series to one another and the outputs of the third reconfigurable connection modules are connected in series to one another. Each reconfigurable module comprises electronic switches selectively controllable so that three connections can be made,
(Continued)

including a direct connection, wherein the voltage supplied at the input of the reconfigurable connection module is transferred to its output with the same polarity, a bypass connection, wherein the output of the re configurable connection module is short-circuited and the output voltage at the module is substantially equal to zero, and a reverse connection, wherein the voltage supplied at the input of the re configurable connection module is transferred to its output with reversed polarity.

9 Claims, 11 Drawing Sheets

(58) Field of Classification Search
CPC .... H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/1582; H02M 3/1584; H02M 3/285; H02M 3/33561; H02M 7/49; H02M 1/045; H02M 7/006; H02M 7/06; H02M 7/068; H02M 7/153; H02M 1/088; H02M 7/103; H02M 7/106; H02M 7/19; H02M 7/08; H02M 7/17; H02M 2001/007; H02M 7/493; H02M 7/5381; H02M 7/483; H02M 7/53873; H02M 1/084; H02M 1/0845; H02M 3/22; H02M 1/08; H02M 1/36; H02M 3/24; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02H 7/261; H02H 7/268; H02J 3/36; H02J 3/01; H02J 3/46; H02J 3/38; Y02B 70/1491
See application file for complete search history.

(56) References Cited

U.S. PATENT DOCUMENTS

| | | | |
|---|---|---|---|
| 9,825,551 B2* | 11/2017 | Oesterheld | H02M 7/49 |
| 2008/0304300 A1* | 12/2008 | Raju | H02M 7/217 |
| | | | 363/125 |
| 2010/0327793 A1* | 12/2010 | Komulainen | H02M 5/225 |
| | | | 307/151 |
| 2013/0258726 A1* | 10/2013 | Mukherjee | H02M 7/4835 |
| | | | 363/40 |
| 2016/0118908 A1* | 4/2016 | Bhalodi | H02M 7/483 |
| | | | 363/89 |
| 2021/0061114 A1* | 3/2021 | Sun | H02J 7/02 |
| 2021/0408889 A1* | 12/2021 | Zhu | H02J 7/06 |
| 2023/0025144 A1* | 1/2023 | Mantov | H02M 3/33573 |
| 2023/0387780 A1* | 11/2023 | Zhuang | H02M 7/217 |
| 2024/0372476 A1* | 11/2024 | Kumar | H02M 3/01 |
| 2024/0388217 A1* | 11/2024 | Fekriasl | C25B 9/65 |

OTHER PUBLICATIONS

Search Report received in Italian Application No. 202100010934, dated Feb. 17, 2022.

* cited by examiner

AC/DC CONVERTER, DC/AC CONVERTER AND DC/DC CONVERTER AND METHOD OF CONTROL OF THE CONVERTER

CROSS-REFERENCE TO RELATED APPLICATIONS

This patent application claims priority of Italian Patent Application No. 102021000010934 filed on Apr. 29, 2021, the entire disclosure of which is incorporated herein by reference.

TECHNICAL FIELD

The present invention refers to an AC/DC converter, a DC/AC converter and a DC/DC converter and the method of control of the converter.

BACKGROUND OF THE INVENTION

The ongoing decarbonisation process implies an increasing use of renewable energy sources, e.g. of wind or photovoltaic type, for electricity production. In some operational situations, the use of renewable electricity sources has led to instability in the frequency and/or voltage of the transmission and distribution electricity grid.

One solution to this problem could be to complement the existing AC transmission and distribution networks with DC transmission and distribution networks, which do not have these stability problems.

These DC transmission and distribution networks connect to the corresponding existing AC networks, using AC/DC converters, to exchange power in one direction, and DC/AC converters, to exchange power in the opposite direction; DC networks with different voltage levels are connected using DC/DC converters.

In particular, the following conversion technologies are known to be used in converters:
  LCC (Line Commutated Converter) using one or more three-phase Graetz rectifier bridges, each consisting of six solid state switches (e.g. thyristors) each of which switches when closing to connect one of the three input phases with one of the two output terminals;
  VSC-PWM (Voltage Source Converter—Pulse Width Modulation) which performs switchings at higher frequencies by modifying the pulse duration accordingly; and
  VSC-MMC (Multilevel Module Converter) using switching modules, equipped with capacitors for temporary energy storage during the wave unfolding.

High-power AC/DC and DC/AC converters of the above type are expensive and also considerable overall dimensions.

In particular, with regard to LCC converters, which are very common, the filters required to eliminate the distortions of the waveforms generated during conversion have considerable overall dimensions and must be housed within specific industrial buildings.

These drawbacks have limited the spread of DC transmission and distribution networks.

A number of solutions are also known which take advantage of a different technology, based on the variation of the transformation ratio.

For example, U.S. Pat. No. 3,909,697A describes a single-phase AC/DC converter, provided with a transformer and a rectifier capable of changing the transformation ratio dynamically during the fundamental wave unfolding.

Patent EP3058649 B1 describes a three-phase AC/DC converter, which uses electronic devices connected to the sockets of a transformer to vary the transformation ratio in order to improve the power factor.

There is therefore a need to realize an AC/DC converter vice versa, which presents lower costs and reduced overall dimensions compared to the converters used to supply these DC transmission and distribution networks.

SUBJECT OF THE INVENTION

The present aim is achieved by the present invention in that it relates to an AC/DC converter of the type described in claim 1.

The present invention also refers to a DC/AC converter as described in claim 2.

Finally, the present invention refers to a DC/DC converter as described in claim 3.

BRIEF DESCRIPTION OF THE DRAWINGS

For a better understanding of the invention, a preferred non-limiting example will now be provided with reference to the accompanying drawings in which.

DETAILED DESCRIPTION OF PREFERRED EMBODIMENT OF THE INVENTION

Figure 1:
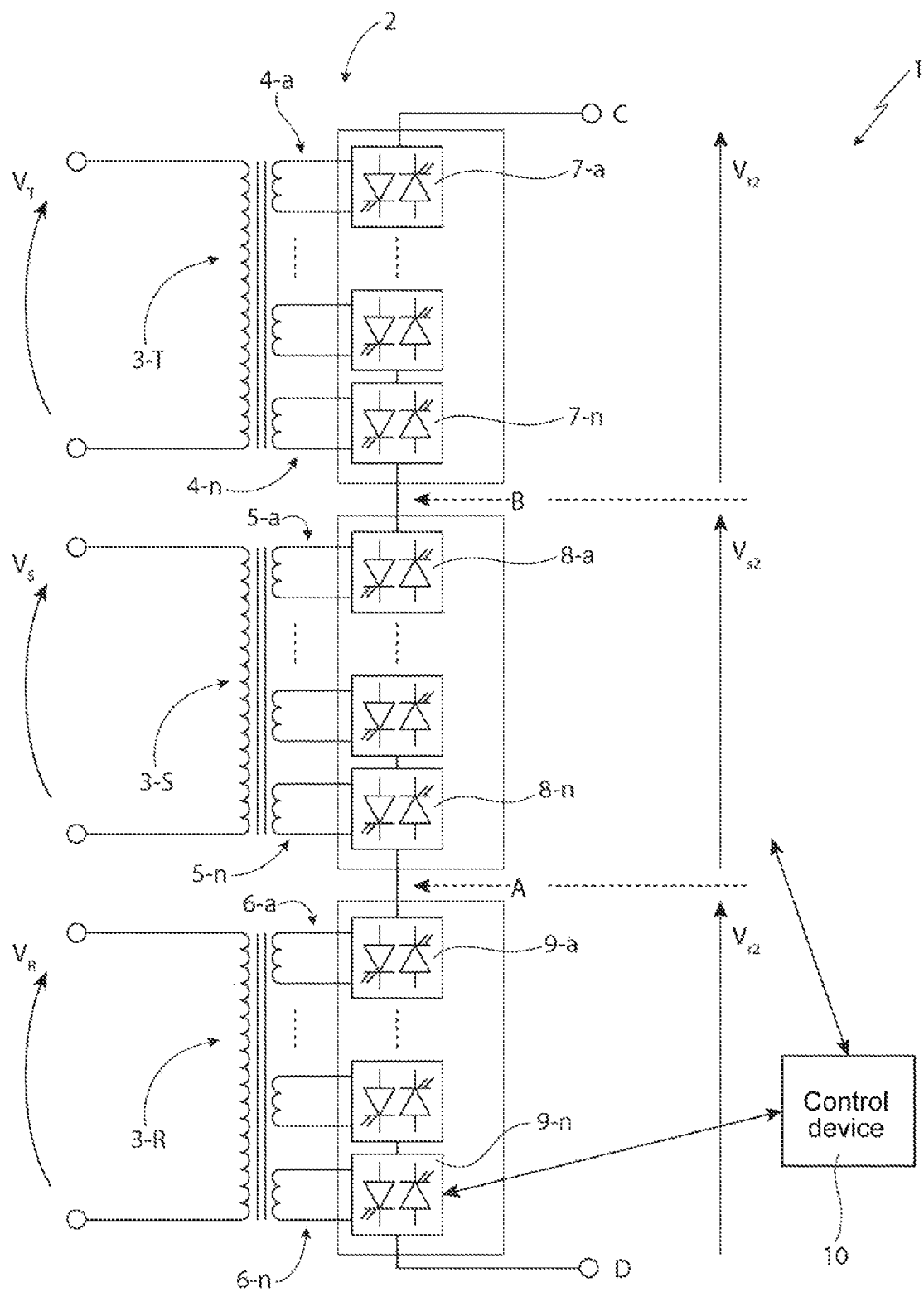
FIG. 1 shows, in a schematic manner, an AC/DC converter realized according to the dictates of the present invention.

FIG. 1 shows, schematically, an AC/DC converter realized in accordance with a first embodiment of the present invention and usable, for example, for the exchange of power from an AC network to a DC network (rectifier).

The converter 1 comprises a three-phase transformer 2 which, in the example shown, has a first primary winding 3-T, a second primary winding 3-S and a third primary winding 3-R each of which receives, as is known, a respective sinusoidal phase voltage $V_T$, $V_S$ and $V_R$, the voltages having the same frequency, the same peak value Vp and phases differing by $2/3\pi$ radians, i.e. 120°.

The first primary winding 3-T is magnetically linked with a series of isolated groups of turns producing a plurality of first secondary windings 4-*a*, 4-*b*, . . . 4-*n*, the second primary winding 3-S is magnetically linked with a series of isolated groups of turns producing a plurality of second secondary windings 5-*a*, 5-*b*, . . . 5-*n* and the third primary winding 3-R is magnetically linked with a series of isolated groups of turns producing a plurality of third secondary windings 6-*a*, 6-*b*, . . . 6-*n*.

In the example depicted, the primary windings 3-T, 3-S and 3-R and the secondary windings are realized in a single three-phase transformer body (not shown for simplicity's sake). Obviously, three separate single-phase transformers (not shown) can be produced, each of which comprises a respective primary winding 3-T, 3-S, 3-R and a corresponding plurality of first secondary windings 4-a, 4-b, . . . 4-n, of second secondary windings 5-a, 5-b, . . . 5-n and of third secondary windings 6-a, 6-b, . . . 6-n.

Each primary winding may consist of a single group of turns, or of a plurality of isolated groups of turns (not shown).

Each first secondary winding 4-a, 4-b, . . . 4-n is connected on the input side with a respective first reconfigurable connection module 7-a, 7-b, . . . 7-n and the outputs of the first reconfigurable connection modules 7-a, 7-b, . . . 7-n are connected in series to one another. The voltage $V_{T2}$ present at the ends of the first series of reconfigurable connection modules 7-a, 7-b, . . . 7-n is applied to terminals denoted by C and B. In the example depicted there are ten first reconfigurable connection modules (n=10) but obviously the number can be different.

Similarly, each second secondary winding 5-a, 5-b, . . . 5-n is connected on the input side with a respective second reconfigurable connection module 8-a, 8-b, . . . 8-n and the outputs of the second reconfigurable connection modules 8-a, 8-b, . . . 8-n are connected in series with one another. The voltage $V_{S2}$ present at the ends of the second series of reconfigurable connection modules 8-a, 8-b, . . . 8-n is applied to terminals denoted by B and A. In the example depicted there are ten second reconfigurable connection modules (n=10) but obviously the number can be different.

Finally, each third secondary winding 6-a, 6-b, . . . 6-n is connected on the input side with a respective third reconfigurable connection module 9-a, 9-b, . . . 9-n and the outputs of the third reconfigurable connection modules 9-a, 9-b, . . . 9-n are connected in series with one another. The voltage $V_{R2}$ present at the ends of the third series of reconfigurable connection modules 9-a, 9-b, . . . 9-n is applied to terminals marked A and D. In the example depicted there are ten third reconfigurable connection modules (n=10) but obviously the number can be different.

The terminals C and D represent the output terminals of the converter 1 on which there is a smoothed DC voltage.

Figure 2:
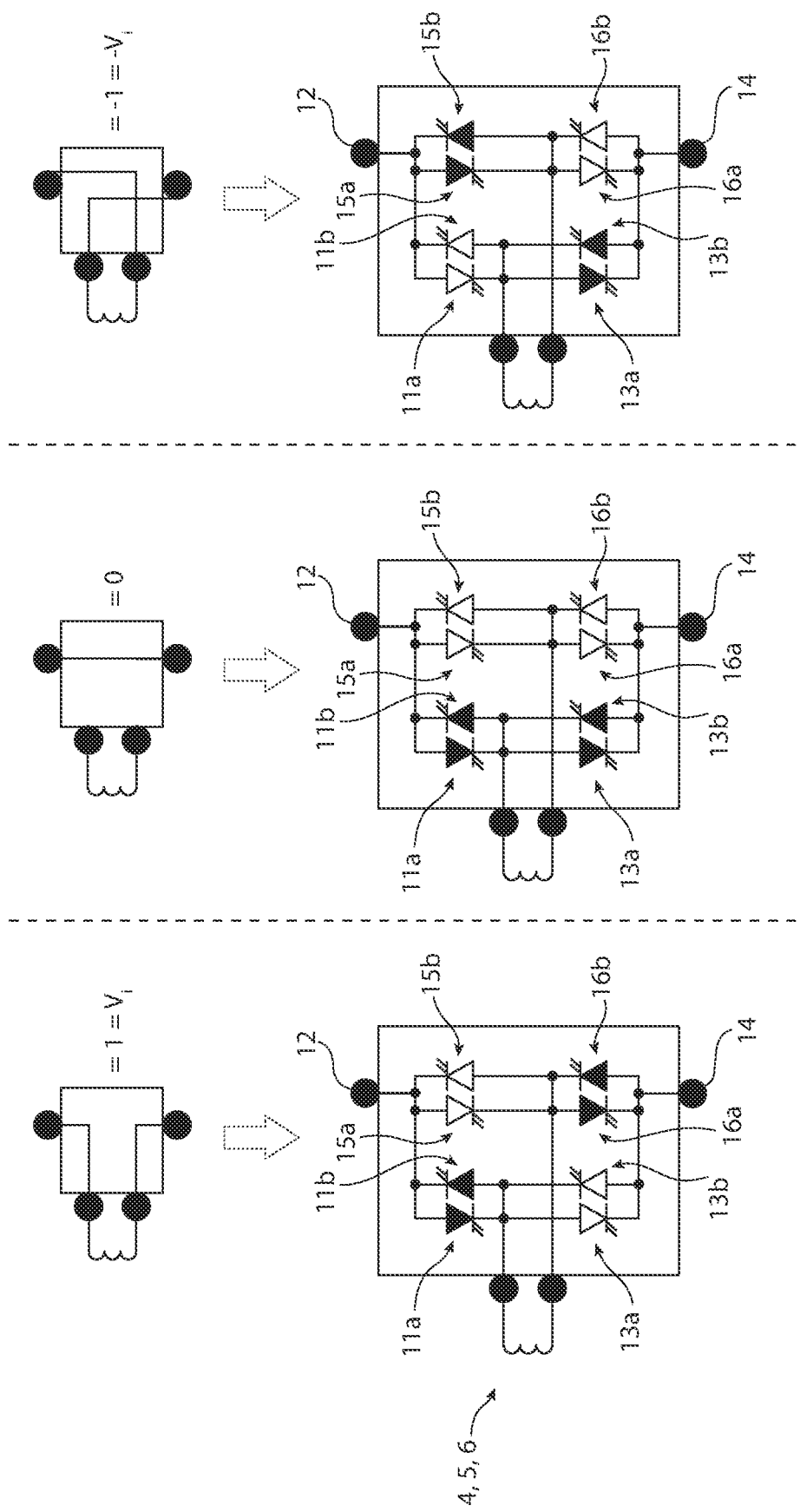
FIG. 2 shows a detail of the converter of FIG. 1.

Each reconfigurable output connection module 7, 8 and 9 comprises a plurality of electronic switches whose switching is controlled by a control device 10 to make three connection modes of the reconfigurable connection module, among which:

A direct connection wherein the voltage supplied at the input of the reconfigurable connection module 7, 8 or 9 is transferred to the output with the same polarity (see schematic representation of FIG. 2 top left);

a bypass connection wherein the output of the reconfigurable connection module 7, 8 or 9 is short-circuited and the output voltage at the module is substantially equal to zero (see the schematic representation of FIG. 2 at the top centre);

a reverse connection wherein the voltage supplied at the input of the reconfigurable connection module 7, 8 or 9 is transferred to the output with reversed polarity (see schematic representation of FIG. 2 top right).

A voltage value substantially equal to zero means a voltage of a few units of volts.

These connections will be described with reference to FIG. 2 which shows a possible configuration of the reconfigurable connection module 7, 8 or 9. However, it is clear that what is depicted in FIG. 2 is a non-limiting example, the reconfigurable connection module 7, 8 or 9 may have different structure and components than those shown.

The reconfigurable connection module comprises four pairs of thyristors that can be controlled by operation and interdiction (different controlled switches can of course be used), one thyristor of each pair is used for rectifier operation (AC/DC, these are the thyristors denoted by the subscript "b"), the other (these are the thyristors denoted by the subscript "a") for inverter operation (DC/AC), as described below:

a first pair of thyristors 11a, 11b arranged in parallel to one another with opposite directions and interposed between a first output of a secondary 4, 5 or 6 and a first output terminal 12 of the reconfigurable connection module;

a second pair of thyristors 13a, 13b arranged in parallel to one another with opposite directions and interposed between the first outlet of the secondary 4, 5 or 6 and a second output terminal 14 of the reconfigurable connection module;

a third pair of thyristors 15a, 15b arranged in parallel to one another with opposite directions and interposed between a second output of the secondary 4, 5 or 6 and the first output terminal 12 of the reconfigurable connection module; and a fourth pair of thyristors 16a, 16b arranged in parallel to one another with opposite directions and interposed between the second output of the secondary 4, 5 or 6 and the second output terminal 14 of the reconfigurable connection module.

In particular, to make:

the direct connection, the thyristors 11b and 16b are brought into the operating mode to bring the input voltage to the output of the reconfigurable connection module between the terminals 12 and 14;

the bypass connection wherein the thyristors 11b and 13b, or 16b and 15b, are controlled to operate in order to short-circuit the terminals 12 and 14;

the reverse connection wherein the terminals 13b and 15b are brought into the operating mode in order to set—with opposite polarity to that realized in the direct diagram—the secondary output voltage between the terminals 12 and 14.

According to the present invention, the control device 10 is configured to cyclically make for each reconfigurable connection module 7, 8 or 9 in successive instants a direct connection, a bypass connection and a reverse connection.

Figure 3A:
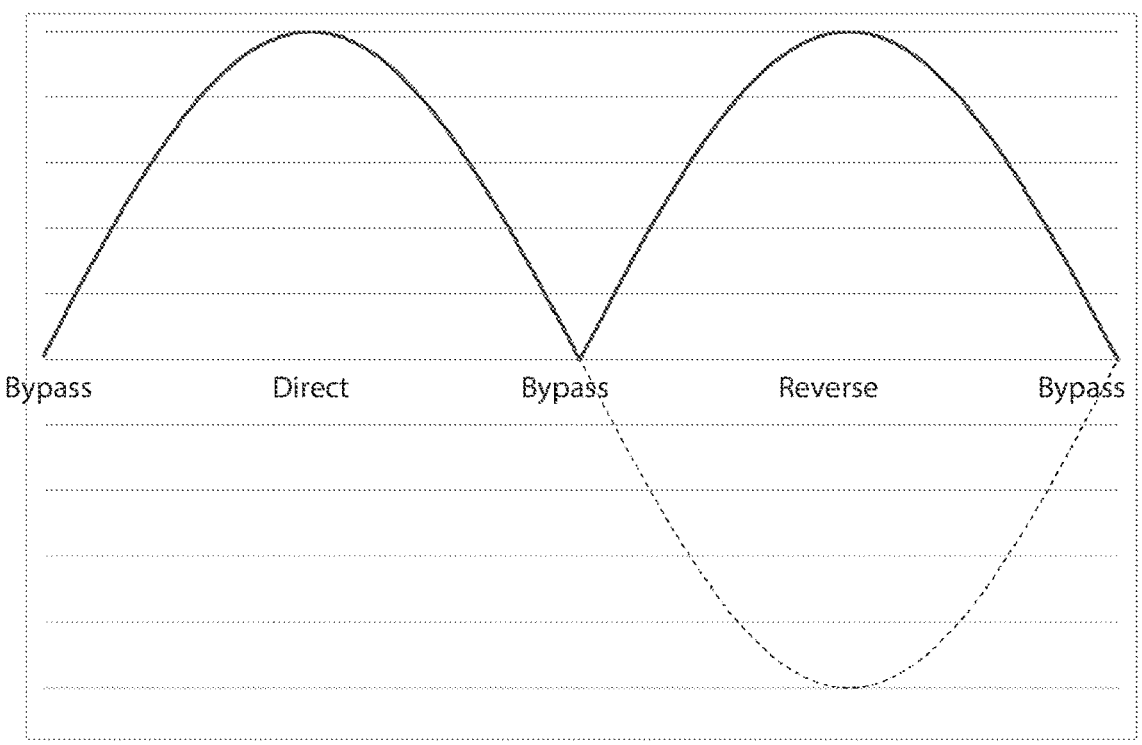
FIGS. 3*a*-3*j* show electrical quantities controlled by the converter of FIG. 1.
Figure 3B:
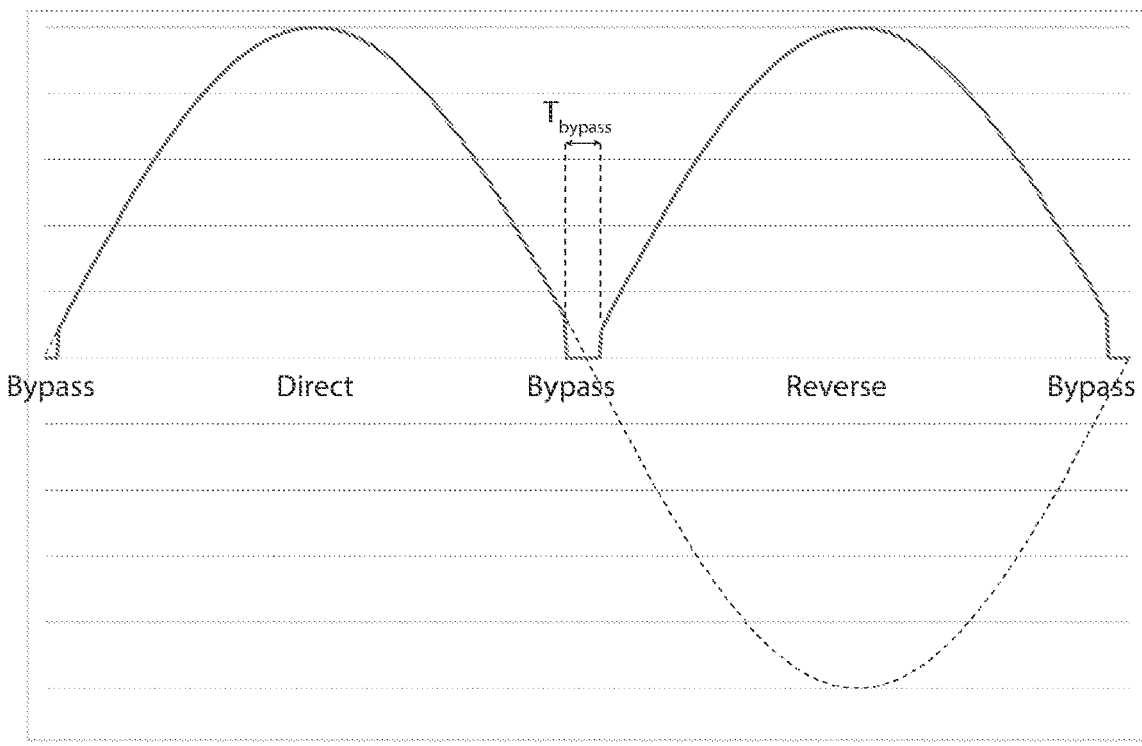
Figure 3C:
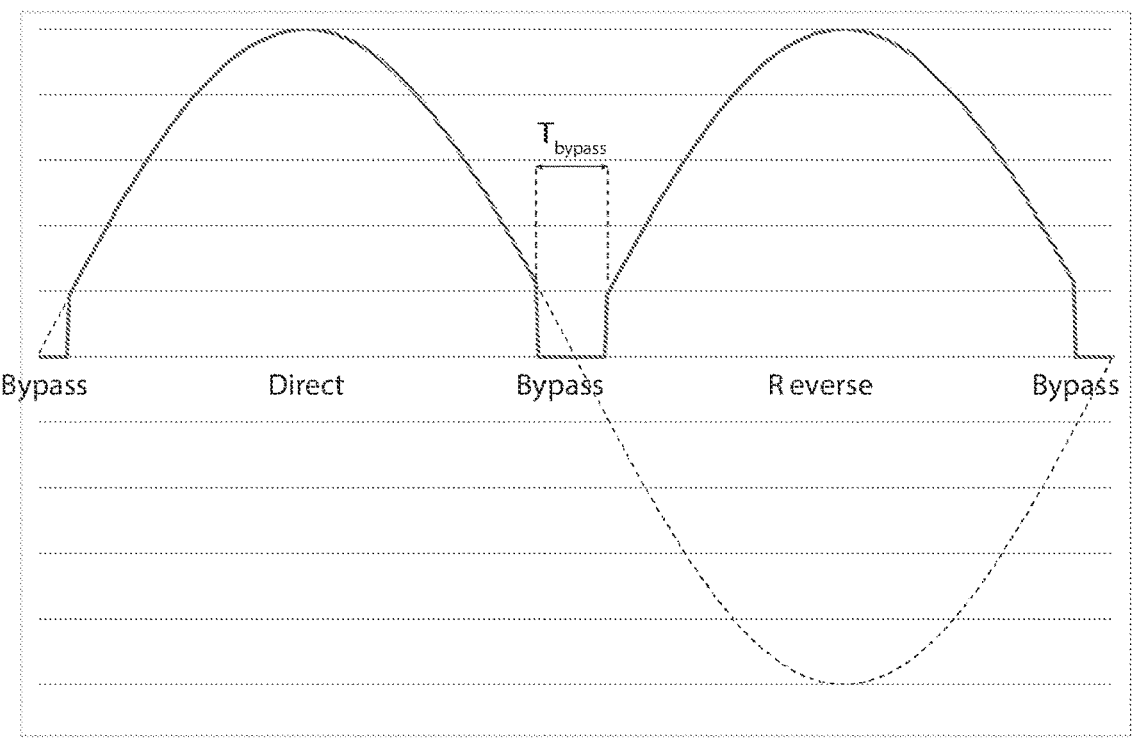
Figure 3D:
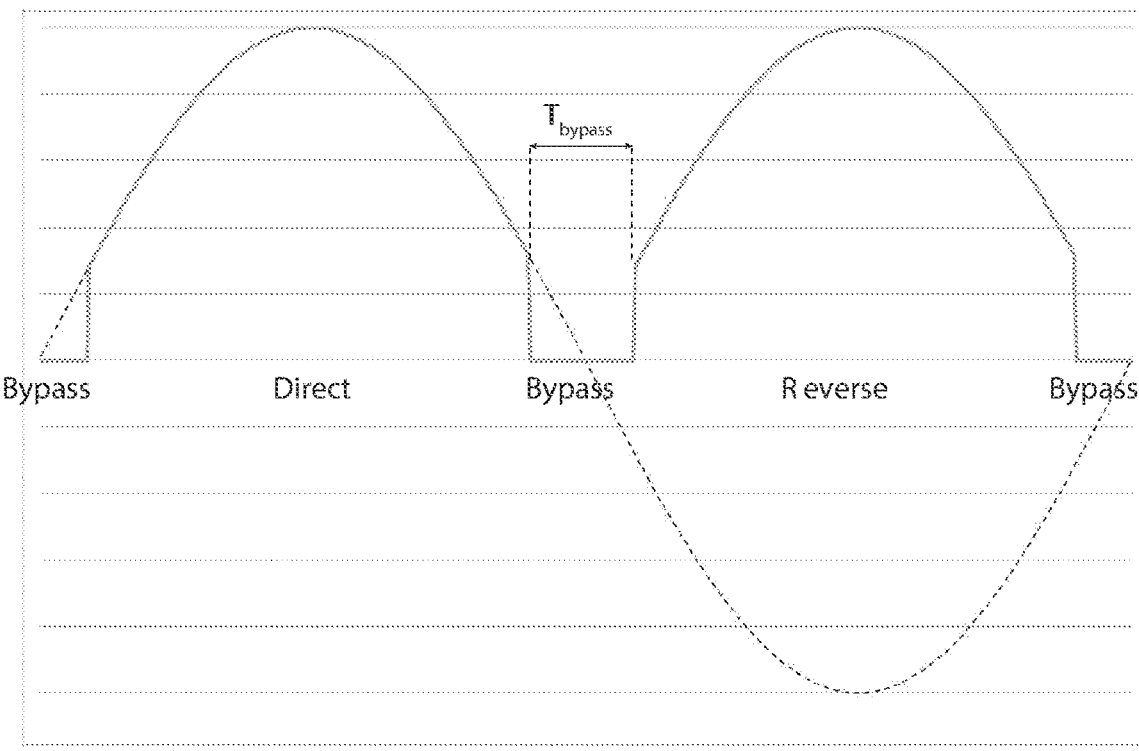
Figure 3E:
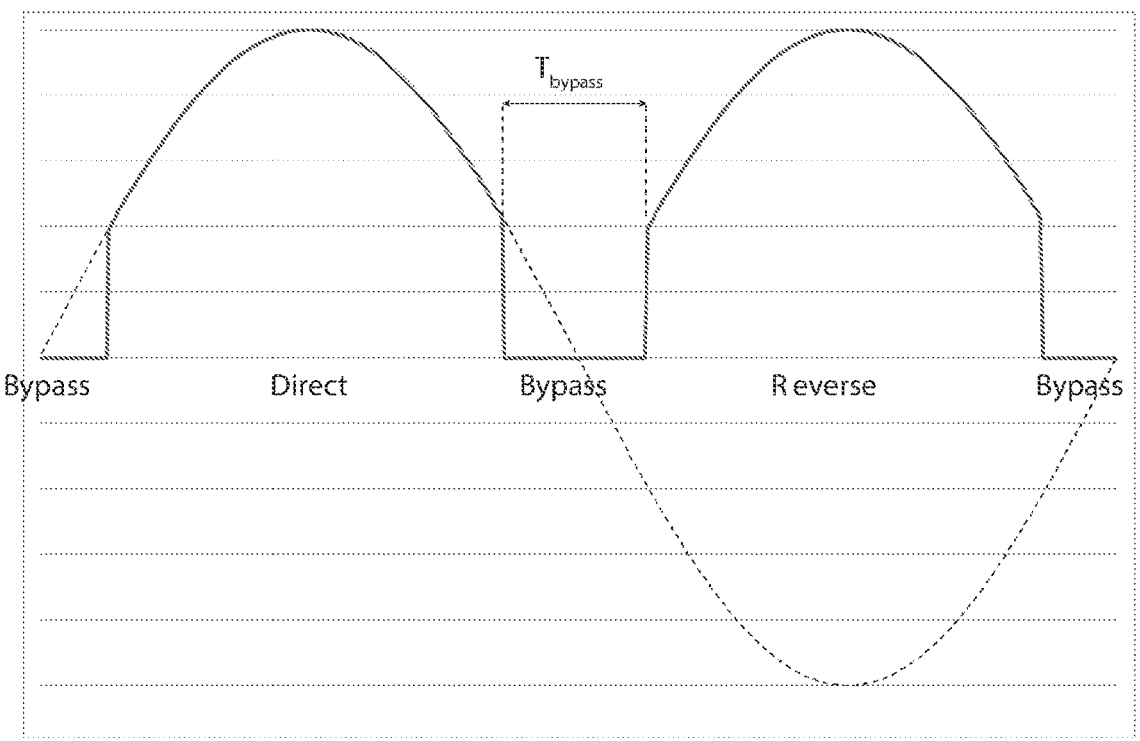
Figure 3F:
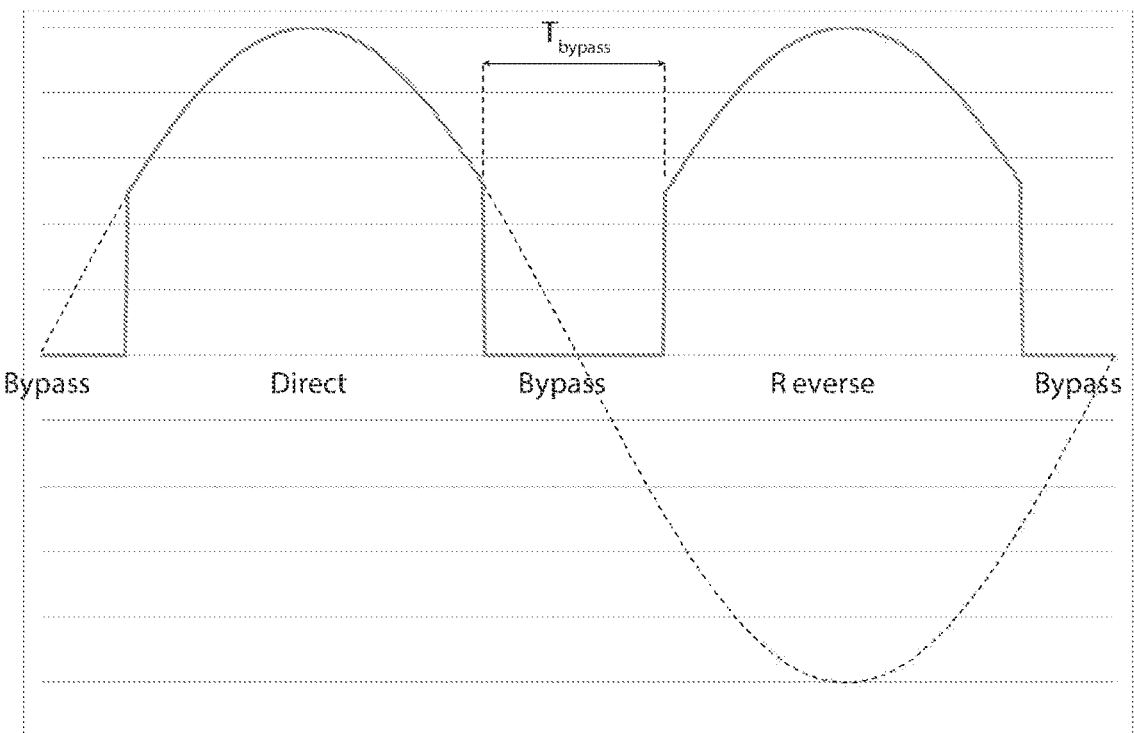
Figure 3G:
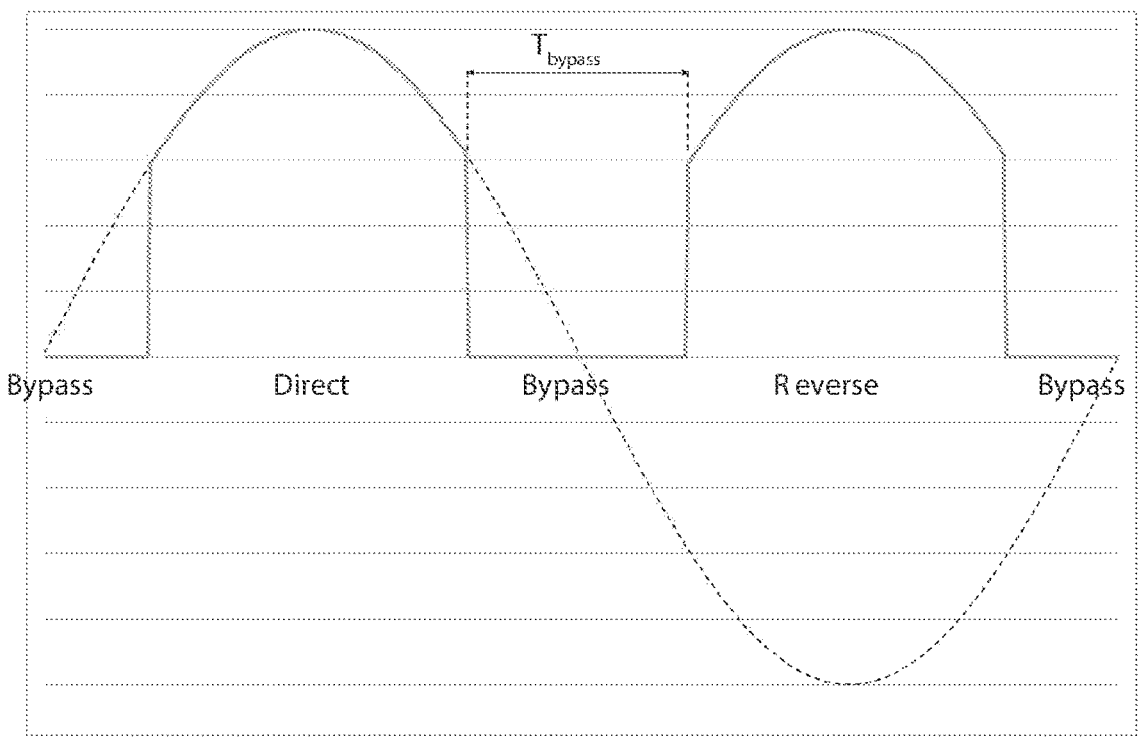
Figure 3H:
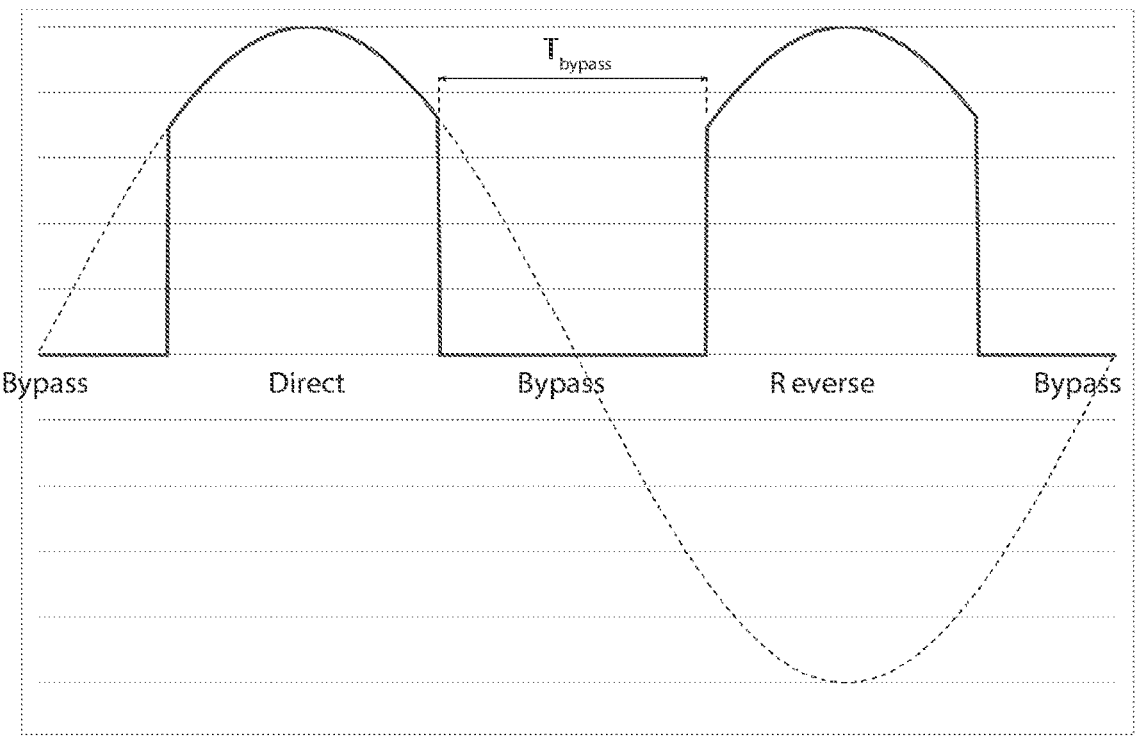
Figure 3I:
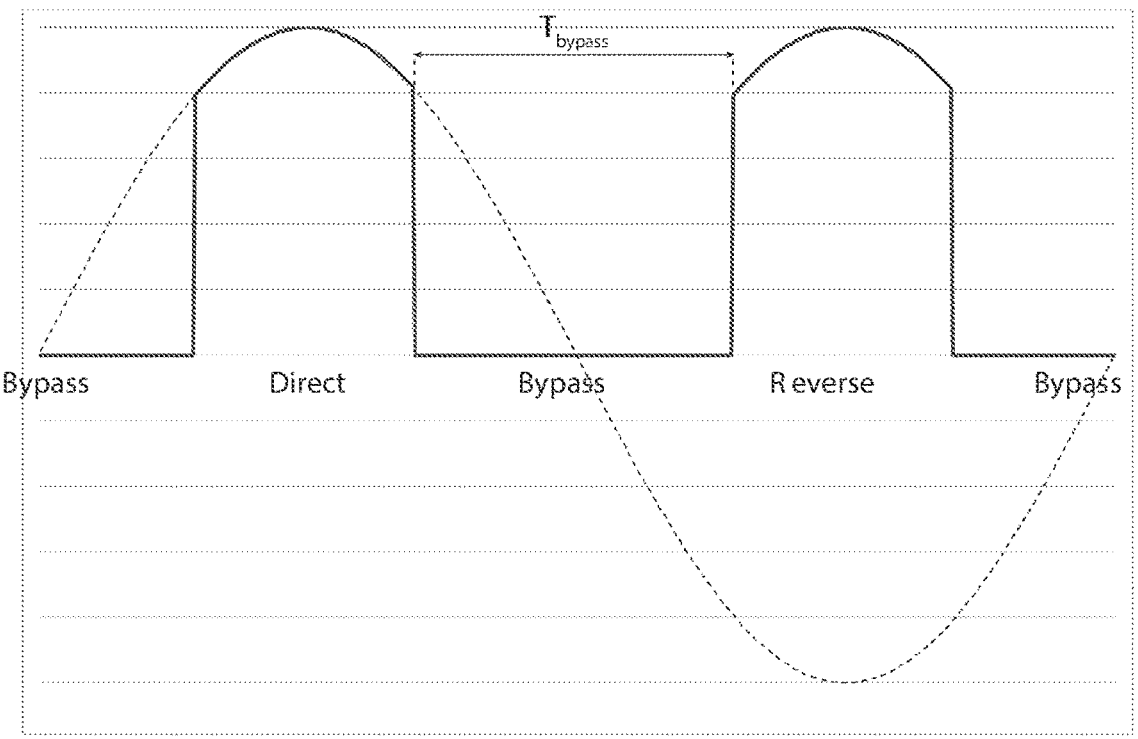

FIG. 3a shows the waveform at the output of a first module of the series in which a direct connection is made during the positive polarity of the sinusoidal alternating voltage supplied at the input of the module, a bypass connection is made at the instant in which the alternating voltage cancels and a reverse connection is made during the negative polarity of the sinusoidal alternating voltage.

Figure 3J:
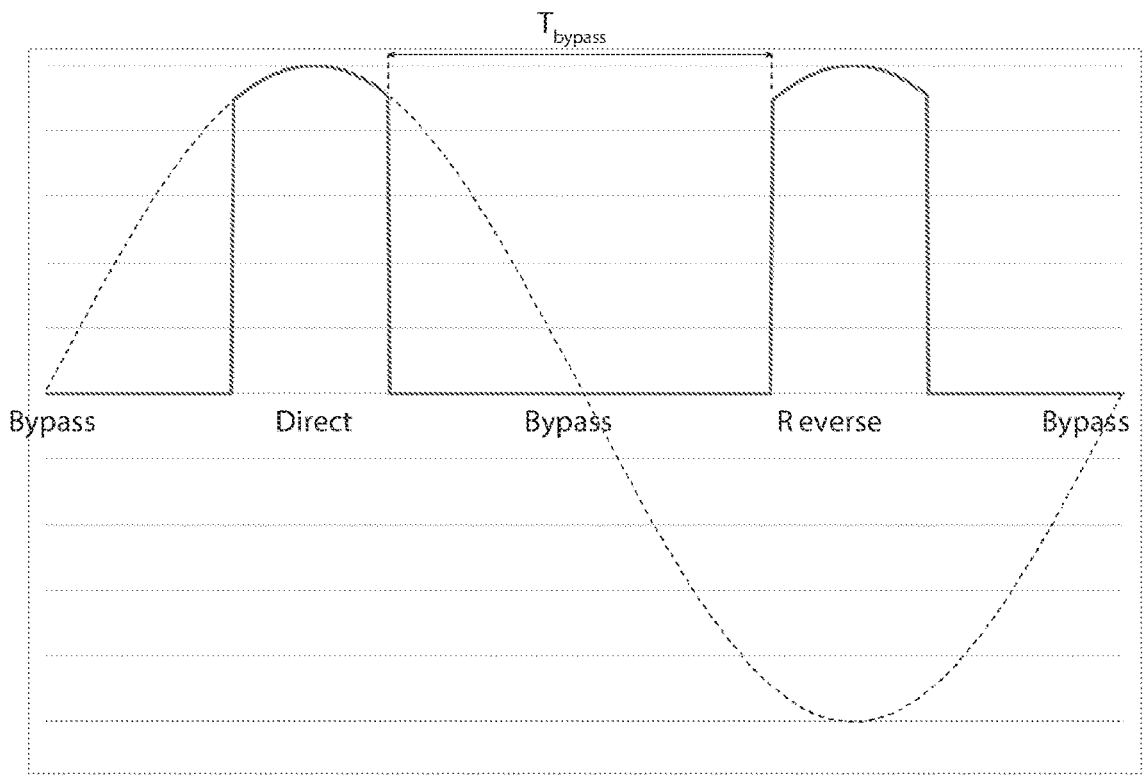

The control device 10 is configured to control, for each connection module belonging to the first, to the second and to the third plurality, a time span $T_{bypass}$ of the bypass connection that increases between a first module of the series (FIG. 3a $T_{bypass}$=0) towards the last module of the series (FIG. 3j) so that the total voltage present at the ends of the series of modules (FIG. 4), that is given by the sum of the voltages present at the output of each reconfigurable connection module (FIG. 3a-FIG. 3j), comprises:

an alternating component (waveform A) that varies in steps, by reproducing a waveform with double frequency with respect to the fundamental T, S, R and a residual noise, with amplitude and frequency linked to the number of steps; and a direct component.

The converter is configured to arrange in series to one another $V_{T2}$ $V_{S2}$ and $V_{R2}$ present at the ends (C-B, B-A and A-D) of the three series of first, second and third modules so as to cancel the double frequency alternating components (waveform A) that cancel one another out and maintain only the sum of the direct components that are added together thus producing a significantly smoothed output voltage at the converter (denoted by C).

The smoothed direct component thus produced is free of significant distortions, thus solving the distortion problems of the typical waveforms of converters using three-phase electronic bridges. The absence of waveform distortion ensures a good quality of service without any need for filters, or at least small filters to eliminate residual noise.

From a mathematical point of view, the control device 10 determines a transformation ratio k of each phase T, S, R, from +100% (in-phase) to −100% (counter-phase), independently of the other two phases, according to the direct, bypass and reverse type connection diagram of the relative reconfigurable connection modules 7, 8, 9 according to the following formula:

$$k = \frac{\sum_{i=1}^{M} n_i c_i}{N_1}$$

Where:
$N_1$ is the number of turns of the primary winding of a phase R, S, T
M is the number of modules connected to the plurality of secondary windings of the same phase
$n_i$ is the number of turns of the i-th secondary winding of the same phase
$c_i$ can take the following values: 1=direct, 0=bypass, −1=reverse, according to the connection diagram of the i-th module of the same phase The connection diagram $c_i$ of the reconfigurable modules of each phase T, S, R, is dynamically modified, so as to vary the relative transformation ratio in successive steps, approximating a harmonic function of fundamental frequency equal to that of the corresponding primary voltage, as indicated for example by the following pairs of formulas:

$$k_R = K \sin(\omega t) \qquad V_R = V_p \sin(\omega t)$$
$$k_S = K \sin\left(\omega t + \frac{2\pi}{3}\right) \quad V_S = V_p \sin\left(\omega t + \frac{2\pi}{3}\right)$$
$$k_T = K \sin\left(\omega t + \frac{4\pi}{3}\right) \quad V_T = V_p \sin\left(\omega t + \frac{4\pi}{3}\right)$$

Where:
$k_R, k_S, k_T$, are the transformation ratios of each individual phase R, S, T
K is the highest expected ratio
$V_R, V_S, V_T$, are the voltages of the individual phases on the primary side
$V_p$ is the peak voltage on the primary side The voltage at the ends of the series of the plurality of modules 7, 8, 9 of each phase is then calculated according to the following formulas:

$$V_{DA} =$$
$$k_R V_R = K V_p \sin^2(\omega t) = K V_p \frac{1 - \cos(2\omega t)}{2} = \frac{K V_p}{2} - \frac{K V_p \cos(2\omega t)}{2}$$

$$V_{AB} = k_S V_S = K V_p \sin^2\left(\omega t + \frac{2\pi}{3}\right) =$$
$$K V_p \frac{1 - \cos\left(2\omega t + \frac{4\pi}{3}\right)}{2} = \frac{K V_p}{2} - \frac{K V_p \cos\left(2\omega t + \frac{4\pi}{3}\right)}{2}$$

$$V_{BC} = k_T V_T = K V_p \sin^2\left(\omega t + \frac{4\pi}{3}\right) =$$
$$K V_p \frac{1 - \cos\left(2\omega t + \frac{2\pi}{3}\right)}{2} = \frac{K V_p}{2} - \frac{K V_p \cos\left(2\omega t + \frac{2\omega}{3}\right)}{2}$$

Where:

$$\frac{K V_p}{2}$$

is the direct component of each phase $$\frac{K V_p \cos(2\omega t)}{2}, \frac{K V_p \cos\left(2\omega t + \frac{4\pi}{3}\right)}{2}, \frac{K V_p \cos\left(2\omega t + \frac{2\pi}{3}\right)}{2},$$

are the alternating components of each phase.

The three branches C-B, B-A, A-D are arranged in series so as to cancel the alternating components and maintain only the sum of the direct components, according to the following formula:

$$V_{DC} = \frac{3 K V_p}{2} - \frac{K V_p \cos(2\omega t)}{2} -$$
$$\frac{K V_p \cos\left(2\omega t + \frac{4\pi}{3}\right)}{2} - \frac{K V_p \cos\left(2\omega t + \frac{2\pi}{3}\right)}{2} = \frac{3 K V_p}{2}$$

This configuration also ensures that the waveform of the current of each phase T, S, R, of the primary is matched to the waveform of the respective voltage, as evidenced by the following formulas:

$$I_R = I_{DC} k_R = I_{DC} K \sin(\omega t)$$
$$I_S = I_{DC} k_S = I_{DC} K \sin\left(\omega t + \frac{2\pi}{3}\right)$$
$$I_T = I_{DC} k_T = I_{DC} K \sin\left(\omega t + \frac{4\pi}{3}\right)$$

Where:
$I_R, I_S, I_T$, are the currents of each individual phase on the primary side
$I_{DC}$ is the direct current flowing in all branches arranged in series
$k_R, k_S, k_T$, are the transformation ratios of each individual phase
K is the highest expected ratio The AC/DC converter can adjust the output voltage of the converter, the active and reactive power absorbed, by appropriately modifying the amplitude and phase shift of the function of change of the transformation ratio with respect to the fundamental of the primary R S T, in other words by appropriately modifying the number of operational reconfigurable connection modules and the distance of the midpoint of the $T_{bypass}$ of the modules with respect to the zero crossing of the fundamental wave of the primary R S T.

The control device 10 periodically reassigns the order of activation (first vs. last) of the reconfigurable connection modules in order to evenly distribute the thermal stress on the electronic components.

The converter of FIG. 1 can also perform a DC/AC conversion (FIG. 5), e.g. for the exchange of power from a DC network to an AC network (inverter).

In this case too, there are provided a three-phase transformer 2 or three single-phase transformers defining a first primary winding 3-T, a second primary winding 3-S and a third primary winding 3-R.

A plurality of first secondary windings 4-a, 4-b, . . . 4-n are magnetically linked with the first primary winding 3-T, a plurality of second secondary windings 5-a, 5-b, . . . 5-n are magnetically linked with the second primary winding 3-S and a plurality of third secondary windings 6-a, 6-b, . . . 6-n are magnetically linked with the third primary winding 3-R.

There is provided a plurality of first, second and third reconfigurable connection modules, each of which is respectively connected on the output side with a first, a second and a third secondary winding; the inputs of the first reconfigurable connection modules are connected in series to one another, the inputs of the second reconfigurable connection modules are connected in series to one another and the inputs of the third reconfigurable connection modules are connected in series to one another.

A DC voltage Vcc to be converted is applied at the ends of the series of inputs of the first, of the second and of the third reconfigurable connection modules.

Each reconfigurable connection module comprises electronic switches selectively controllable so that three connections can be made according to the control of a control device (10):

a direct connection wherein the voltage $V_i$ present at the input of the respective reconfigurable connection module is transferred to the output with the same polarity so as to supply the respective secondary winding;

a bypass connection wherein the input of the reconfigurable connection module is short-circuited, without supplying the respective secondary winding;

a reverse connection wherein the voltage $V_i$ present at the input of the reconfigurable connection module is transferred to the output with reversed polarity so as to supply the respective secondary winding with the voltage $-V_i$.

The control device 10 is configured to control for each reconfigurable connection module 7, 8 and 9 in successive instants a direct connection, a bypass connection and a reverse connection, with time span of the bypass connection that increases between a first module in the series towards the last module in the series (FIGS. 3a-3j).

Figure 4:
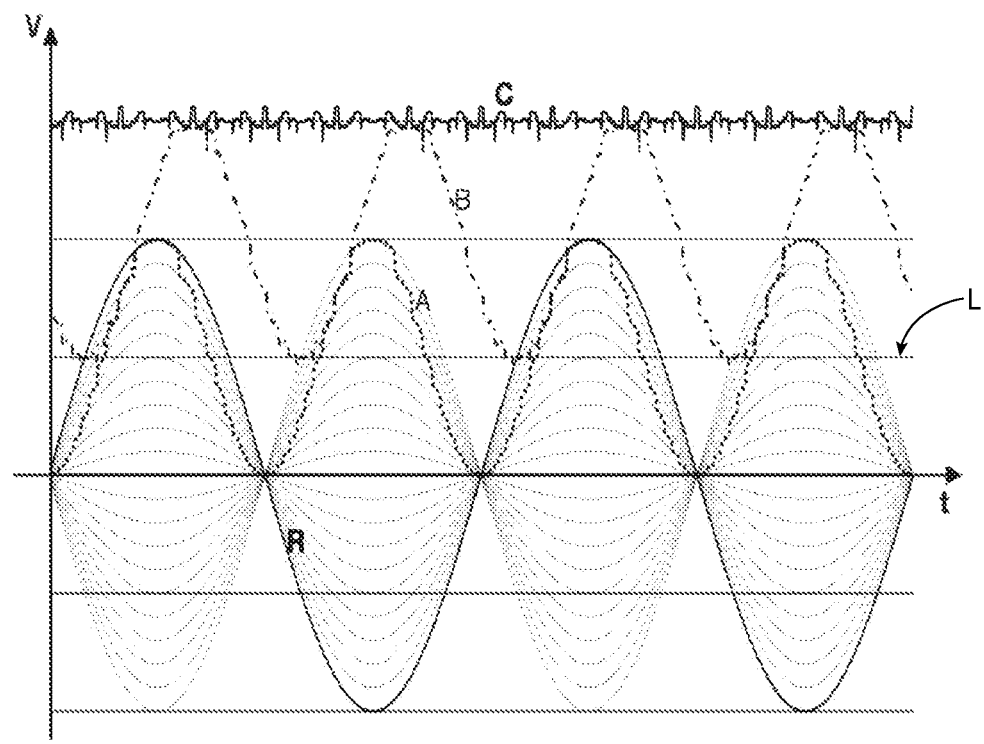
FIG. 4 shows the electrical output quantities of the converter of FIG. 1.

According to the above operations on the series of inputs of the first, second and third modules 7, 8 and 9 a direct component and an alternating component with double frequency with respect to a fundamental frequency and a waveform similar to that of the waveform A depicted in FIG. 4 are present.

The converter is further configured to arrange in series to one another the voltages present on the series of the inputs (C-B, B-A and A-D) of the three series of first, second and third modules, so as to cancel the three alternating components with double frequency with respect to the fundamental frequency that cancel one another out, maintaining the three direct components that are added and take a value equal to the voltage Vcc present at the input of the converter.

Figure 7:
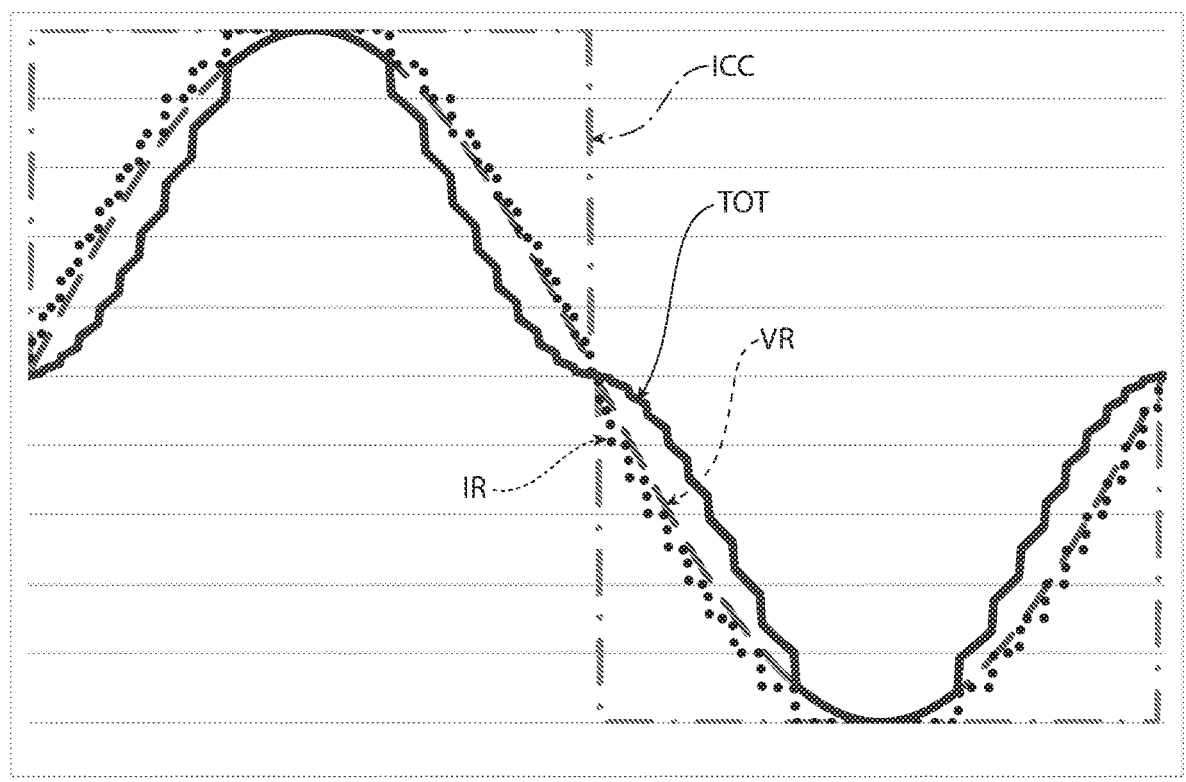
FIG. 7 shows the operating principle of the DC/AC converter of FIG. 5.

The converter is configured to produce three sums of the voltages at the ends of the first, second and third secondary windings 4a-4n, 5a-5n and 6a-6n, respectively connected to the outputs of the first, of the second and of the third connection modules, configured in operating mode and therefore not in bypass mode. Referring to FIG. 7, the waveform indicated by TOT depicts one of these three sums. The waveforms TOT are compound and equal to the waveforms A depicted in FIG. 4, which are present on the respective inputs of the modules 7, 8 and 9, during the direct connections and to the waveforms A, overturned during the reverse connections; these waveforms TOT are spaced by 120° with respect to one another according to the control given by the control device 10 and have the same fundamental frequency. The phase shift is achieved by acting on the switching instants of the electronic switches of the first, second and third modules 7, 8 and 9.

The three currents ICC flowing through the secondary windings 4a-4n, 5a-5n and 6a-6n, on the other hand, have the square waveform shown in FIG. 7 in which the current reverses polarity at the zero crossing of the corresponding voltage TOT.

The three waveforms TOT, sums of the voltages of the plurality of the first secondary windings 4a-4n in the operating mode, of the plurality of the second secondary windings 5a-5n in the operating mode and of the plurality of the third secondary windings 6a-6n in the operating mode, with the contribution of the three waveforms ICC of the currents flowing therein, produce on the first primary winding 3T, on the second primary winding 3S and on the third primary winding 3R, respectively, the voltages VT, VS and VR (only VR is shown in FIG. 7) with a sinusoidal shape, spaced by 120° with respect to one another, and the currents IT, IS and IR (only IR is shown in FIG. 7) also with a sinusoidal shape consistent with the relative voltages, thus producing the DC/AC conversion.

The voltages and alternating currents thus produced are free of significant distortions, thus solving the distortion problems of the waveforms typical of converters using three-phase electronic bridges. The absence of waveform distortion ensures a good quality of service without any need for filters, or at least small filters to eliminate residual noise.

Referring to FIG. 2 to make:

the direct connection the thyristors 11a and 16a are brought into the operating mode in order to bring the input voltage Vi to the output of the reconfigurable connection module and then supply the secondary;

the bypass connection wherein the thyristors 11a, 13a or 16a, 15a are controlled to operate in order to short-circuit the terminals 12 and 14, without supplying the secondary;

the reverse connection wherein the resistors 13a and 15a are driven into the operating mode in order to set—with opposite polarity to that produced in the direct diagram—the input voltage to the output of the reconfigurable connection module and then supply the secondary with voltage −Vi.

From a mathematical point of view, the control device 10 determines a dynamic variation of the transformation ratio k of each phase by applying the same formulas indicated for the AC/DC converter.

The DC/AC converter device can adjust the output voltage of the converter, the active and reactive power produced, by appropriately modifying the amplitude and phase shift of the function of change of the transformation ratio with respect to the fundamental of the primary R S T, in other words by appropriately modifying the number of operational reconfigurable connection modules and the distance of the midpoint of the $T_{Bypass}$ of the modules with respect to the zero crossing of the fundamental wave of the primary R S T.

The control device 10 periodically reassigns the order of activation (first vs. last) of the reconfigurable connection modules in order to evenly distribute the thermal stress on the electronic components.

Figure 6:
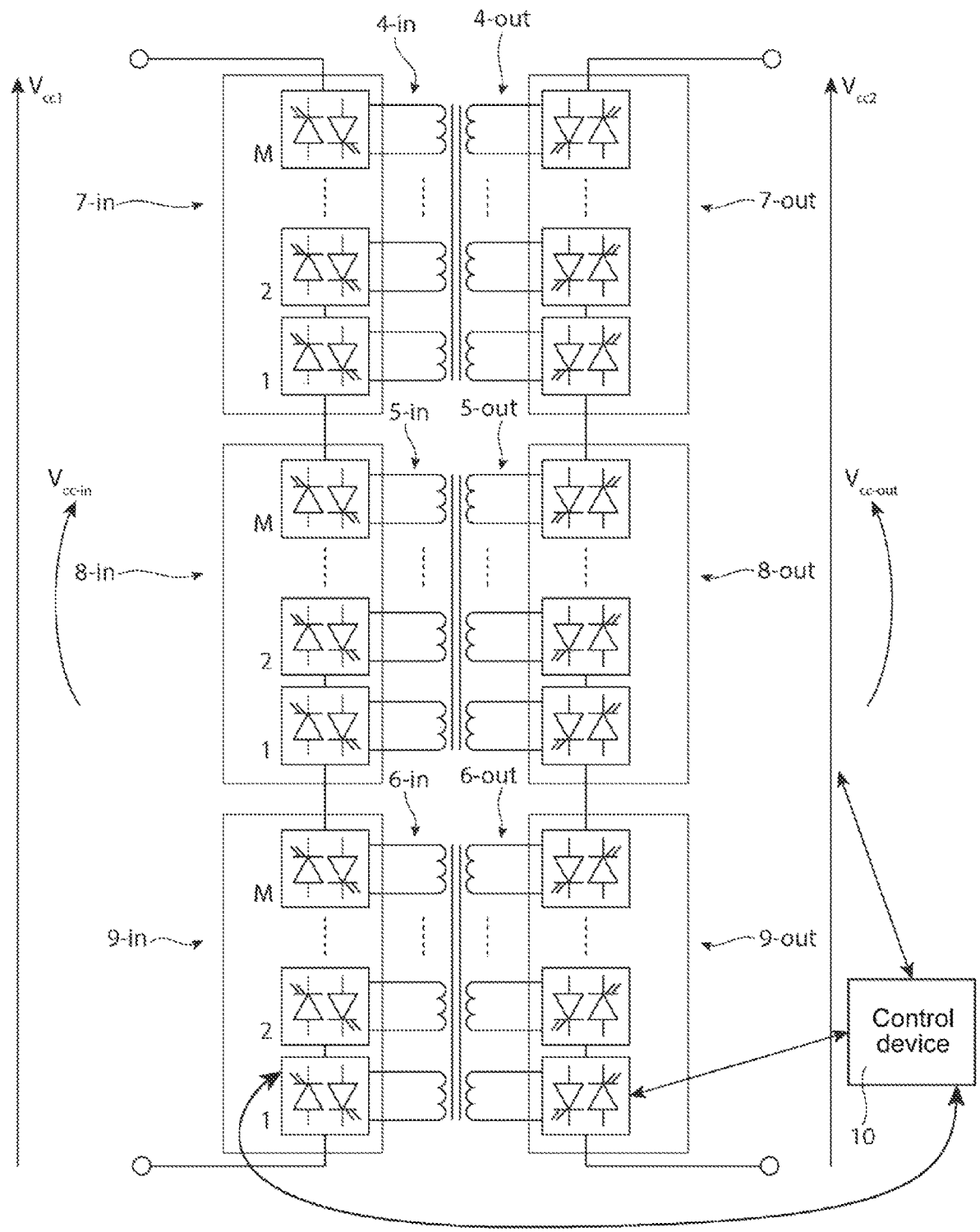
FIG. 6 shows, in a schematic manner, a DC/DC converter realized according to the dictates of the present invention.

With reference to FIG. 6, a DC/DC converter realized according to the dictates of the present invention is shown, for example for the exchange of power from one DC network to another DC network with a different voltage level.

The DC/DC converter comprises:

a plurality of first, second and third reconfigurable input connection modules 7-in, 8-in, 9-in each of which is respectively connected on the output side with a respective first input winding 4-in, a respective second input winding 5-in and a respective third input winding 6-in; the inputs of the first reconfigurable input connection modules 7-in are connected in series to one another, the inputs of the second reconfigurable input connection modules 8-in are connected in series to one another and the inputs of the third reconfigurable input connection modules 9-in are connected in series to one another.

Each reconfigurable input connection module comprises electronic switches selectively controllable so that three connections can be made according to the control of a control device 10:

a direct connection wherein the voltage $V_i$ present at the input of the respective reconfigurable input connection module is transferred to the output with the same polarity so as to supply the respective input winding;

a bypass connection wherein the input of the reconfigurable connection module is short-circuited so as not to supply the input winding;

a reverse connection wherein the voltage $V_i$ present at the input of the reconfigurable input connection module is transferred to the output with reversed polarity so as to supply the respective input winding with the voltage $-V_i$.

The converter further comprises a plurality of first, second and third reconfigurable output connection modules 7-out, 8-out, 9-out each of which is respectively connected at the input with a respective first output winding 4-out, a respective second output winding 5-out and a respective third output winding 6-out; the outputs of the first reconfigurable output connection modules 7-out are connected in series with one another, the outputs of the second reconfigurable output connection modules 8-out are connected in series with one another and the outputs of the third reconfigurable output connection modules 9-out are connected in series with one another.

The first input windings 4-in are magnetically coupled with the first output windings 4-out, the second input windings 5-in are magnetically coupled with the second output windings 5-out and the third input windings 6-in are magnetically coupled with the third output windings 6-out. The magnetic coupling can be made using a single transformer or three separate single-phase transformers.

Each reconfigurable output connection module 7-out, 8-out and 9-out comprises a plurality of electronic switches whose switching is controlled by the control device 10 to make three connection modes of the reconfigurable connection module, among which:

a direct connection wherein the voltage supplied at the input of the reconfigurable output connection 7-out, 8-out or 9-out is transferred to the output with the same polarity;

a bypass connection wherein the output of the reconfigurable output connection module 7-out, 8-out or 9-out is short-circuited and the output voltage at the module is substantially equal to zero;

a reverse connection wherein the voltage supplied at the input of the reconfigurable output connection module 7-out, 8-out or 9-out is transferred to the output with reversed polarity.

The control device 10 is configured to control, for each input connection module belonging to the first, second and third plurality a time span of the bypass connection that increases between a first module of the series towards the last module of the series (FIGS. 3a-3j).

According to the above operations on the series of inputs of the first, second and third reconfigurable input modules, a direct component and an alternating component with double frequency with respect to a fundamental frequency and a waveform similar to that of the waveform A depicted in FIG. 4 are present.

The DC/DC converter is further configured to arrange in series to one another the voltages present on the series of the inputs (C-B, B-A and A-D) of the three series of first, second and third reconfigurable input modules, so as to cancel the three alternating components with double frequency with respect to the fundamental frequency that cancel one another out, maintaining the three direct components that are added and take a value equal to a voltage Vcc1 present at the input of the DC/DC converter.

The DC/DC converter is further configured to produce three sums of the voltages at the ends of the first, second and third input windings 4in, 5in and 6in, respectively connected to the outputs of the first, of the second and of the third input modules, configured in operating mode and therefore not in bypass mode. The waveform indicated with TOT in FIG. 7 depicts one of these three sums. The waveforms TOT are compound and equal to the waveforms A depicted in FIG. 4, which are present on the respective inputs of the modules 7in, 8in and 9in, during the direct connections and to the waveforms A, overturned during the reverse connections; these waveforms TOT are spaced by 120° with respect to one another according to the control given by the control device 10 and have the same fundamental frequency. The phase shift is achieved by acting on the switching instants of the electronic switches of the first, second and third modules 7in, 8in and 9in.

The three currents flowing through the input windings 4in, 5in and 6in instead have the square waveform ICC shown in FIG. 7 in which the current reverses polarity at the zero crossing of the corresponding voltage TOT.

The three waveforms TOT, sums of the voltages of the plurality of the first input windings 4in in the operating mode, of the plurality of the second input windings 5in in the operating mode and of the plurality of the third input windings 6in in the operating mode, with the contribution of the three waveforms ICC of the currents flowing therein, produce, respectively, on the first output windings, on the second output windings and on the third output windings voltages VT, VS and VR (in FIG. 7 only VR is shown) with a sinusoidal shape and spaced by 120° with respect to one another.

The control device 10 is configured to control, for each reconfigurable output connection module belonging to the first, to the second and to the third plurality, a time span $T_{bypass}$ of the bypass connection that increases between a first module of the series (FIG. 3a $T_{bypass}$=0) towards the last module of the series (FIG. 3j) so that the total voltage present at the ends of the series of reconfigurable output modules (FIG. 4), that is given by the sum of the voltages present at the output of each reconfigurable connection module (FIG. 3a-FIG. 3j), comprises:

an alternating component (waveform A) that varies in steps, by reproducing a waveform with double frequency with respect to the fundamental and a residual noise, with amplitude and frequency linked to the number of steps; and a direct component.

The converter is configured to arrange in series to one another the voltages present at the ends of the three series of first, second and third reconfigurable output connection modules, so as to cancel the double frequency alternating components that cancel one another out and maintain only the sum of the direct components that are added together, thus producing an almost steady output voltage Vcc2 at the DC/DC converter. The conversion of the DC voltage Vcc1 into DC voltage Vcc2 is thus operated.

The DC/DC converter can adjust the output voltage of the converter by appropriately modifying the number of operational reconfigurable connection modules and the distance of the midpoint of the $T_{bypass}$ of the output modules with respect to the zero crossing of the wave TOT of the respective input windings.

The control device 10 periodically reassigns the order of activation (first vs. last) of the reconfigurable connection modules in order to evenly distribute the thermal stress on the electronic components.

Figure 5:
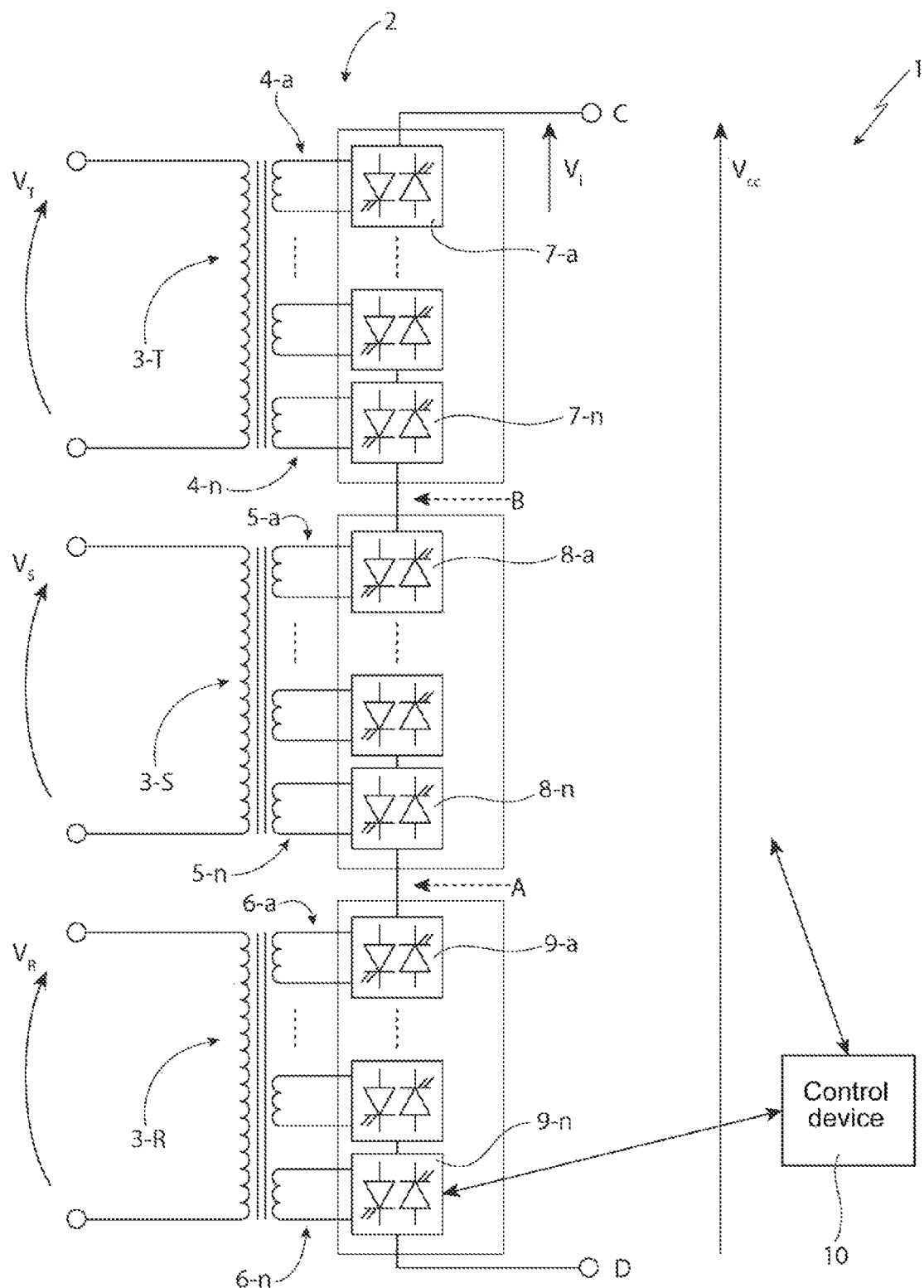
FIG. 5 shows, in a schematic manner, a DC/AC converter realized according to the dictates of the present invention.

Examples of AC/DC, DC/AC, and DC/DC converters have been shown so far with the first, second and third plurality of modules connected in series with one another and according to FIGS. 1, 5 and 6; however, further configurations of the serial arrangement of the modules are possible, according to the construction needs, while remaining in the spirit of the invention according to the following claims.

For example, a possible embodiment is the one which provides for a configuration in series of the modules 7, 8 and 9 with connection in series of the first module of the first plurality of modules 7 with the first module of the second plurality of modules 8 and the first module of the third plurality of modules 9 and so on.

REFERENCE NUMBERS

1 AC/DC and DC/AC converter
2 three-phase transformer
3 primary windings
4 first secondary windings
5 second secondary windings
6 third secondary windings
7 first reconfigurable connection modules
8 second reconfigurable connection modules
9 third reconfigurable connection modules
10 control device
11 thyristors
12 output
13 thyristors
14 output
15 thyristors
16 thyristors

The invention claimed is:

1. An AC/DC converter comprising:
a three-phase transformer or three single-phase transformers defining a first primary winding, a second primary winding and a third primary winding;
a plurality of first secondary windings magnetically linked with the first primary winding, a plurality of second secondary windings magnetically linked with the second primary winding and a plurality of third secondary windings magnetically linked with the third primary winding;
a plurality of first, second and third reconfigurable connection modules each of which is respectively connected on the input side with a first, a second and a third secondary winding;
the outputs of the first reconfigurable connection modules being connected in series to one another, the outputs of the second reconfigurable connection modules being connected in series to one another and the outputs of the third reconfigurable connection modules being connected in series to one another;
each reconfigurable connection module comprising electronic switches selectively controllable so that three connections can be made according to the control of a control device:
a direct connection wherein the voltage supplied to the input of the reconfigurable connection module is transferred to its output with the same polarity;
a bypass connection wherein the output of the reconfigurable connection module is short-circuited and the output voltage at the module is substantially equal to zero;
a reverse connection wherein the voltage supplied to the input of the reconfigurable connection module is transferred to its output with reversed polarity;
said control device being configured to cyclically control, for each reconfigurable connection module in successive instants a direct connection, a bypass connection and a reverse connection;
said control device being configured to control, for each connection module belonging to the first/to the second and to the third plurality, a time span of the bypass connection that increases between a first module of the series towards the last module of the series, so that the total voltage present at the ends of the series of modules that is given by the sum of the voltages present at the output of each reconfigurable connection module comprises:
an alternating component that varies by reproducing a waveform with double frequency with respect to the fundamental frequency and a residual noise; and
a direct component;
said converter being configured to add up the voltages present at the ends of the three series of first, second and third modules in series so as to cancel the double frequency alternating components that cancel one another out and maintain only the sum of the direct components that produce a smoothed output voltage at the converter.

2. A DC/AC converter comprising:
a three-phase transformer or three single-phase transformers defining a first primary winding, a second primary winding and a third primary winding;
a plurality of first secondary windings are magnetically linked with the first primary winding, a plurality of second secondary windings are magnetically linked with the second primary winding and a plurality of third secondary windings are magnetically linked with the third primary winding;

a plurality of first, second and third reconfigurable connection modules each of which is respectively connected on the output side with a first, a second and a third secondary winding; the inputs of the first reconfigurable connection modules are connected in series to one another, the inputs of the second reconfigurable connection modules are connected in series to one another and the inputs of the third reconfigurable connection modules are connected in series to one another;

a DC voltage to be converted is applied at the ends of the series of inputs of the first, of the second and of the third reconfigurable connection modules;

each reconfigurable module comprising electronic switches selectively controllable so that three connections can be made according to the control of a control device:

a direct connection wherein the voltage Vi present at the input of the reconfigurable connection module is transferred to its output with the same polarity so as to supply the respective secondary winding;

a bypass connection wherein the input of the reconfigurable connection module is short-circuited, without supplying the respective secondary winding;

a reverse connection wherein the voltage $V_i$ present at the input of the reconfigurable connection module is transferred to its output with reversed polarity so as to supply the respective secondary winding with the voltage $-V_i$;

the control device being configured to cyclically control, for each reconfigurable connection module, in successive instants a direct connection, a bypass connection and a reverse connection;

the control device is configured to control, for each reconfigurable connection module belonging to the first/to the second and to the third plurality of modules arranged series, a time span of the bypass connection that increases between a first module of the series towards the last module of the series, so that a direct component and an alternating component with double frequency with respect to a fundamental frequency are present on the series of inputs of the first, second and third modules;

the converter is further configured to arrange in series to one another the voltages present on the series of the inputs of the three series of first, second and third modules, so as to cancel the three alternating components with double frequency with respect to the fundamental frequency that cancel one another out, maintaining the three direct components that are added and take a value equal to the voltage to be converted;

the converter is configured to produce three sums of the voltages at the ends of the first, second and third secondary windings, respectively connected to the outputs of the first, of the second and of the third connection modules configured in operating mode and therefore not in bypass mode;

the waveforms are compound and equal to those of the inputs of the respective modules during the direct connections, overturned during the reverse connections, and are spaced by 120° with respect to one another according to the control given by the control device; the currents that flow through the secondary windings instead have square waveforms;

the three waveforms, sums of the voltages, with the contribution of the three waveforms of the currents produce respectively on the first primary winding, on the second primary winding and on the third primary winding voltages with sinusoidal shape and frequency equal to the fundamental frequency spaced by 120° with respect to one another, and currents also with sinusoidal shape consistent with the respective voltages.

3. A DC/DC converter comprising:

a plurality of first, second and third reconfigurable input connection modules, each of which is respectively connected on the output side with a respective first input winding, a respective second input winding and a respective third input winding; the inputs of the first reconfigurable input connection modules are connected in series to one another, the inputs of the second reconfigurable input connection modules are connected in series to one another and the inputs of the third reconfigurable input connection modules are connected in series to one another;

each reconfigurable input connection module comprises electronic switches selectively controllable so that three connections can be made according to the control of a control device:

a direct connection wherein the voltage Vi present at the input of the respective reconfigurable input connection module is transferred to its output with the same polarity so as to supply the respective input winding;

a bypass connection wherein the input of the reconfigurable connection module is short-circuited without supplying the respective input winding;

a reverse connection wherein the voltage $V_i$ supplied at the input of the reconfigurable input connection module is transferred to its output with reversed polarity so as to supply the respective input winding with the voltage $-V_i$;

the converter further comprises a plurality of first, second and third reconfigurable output connection modules, each of which is respectively connected on the input side with a respective first output winding, a respective second output winding and a respective third output winding; the outputs of the first reconfigurable output connection modules are connected in series to one another, the outputs of the second reconfigurable output connection modules are connected in series to one another and the outputs of the third reconfigurable output connection modules are connected in series to one another; the first input windings are magnetically coupled with the first output windings, the second input windings are magnetically coupled with the second output windings and the third input windings are magnetically coupled with the third output windings;

each reconfigurable output connection module comprises a plurality of electronic switches whose switching is controlled by the control device to make three connection modes of the reconfigurable connection module, among which:

direct connection wherein the voltage supplied at the input of the reconfigurable output connection module is transferred to its output with the same polarity;

a bypass connection wherein the output of the reconfigurable output connection module is short-circuited and the output voltage at the module is substantially equal to zero;

a reverse connection wherein the voltage supplied at the input of the reconfigurable output connection module is transferred to its output with reversed polarity;

the control device is configured to control, for each input connection module belonging to the first/to the second and to the third plurality, a time span $T_{bypass}$ of the bypass connection that increases between a first module of the series towards the last module of the series, so that a direct component and an alternating component with double frequency with respect to a fundamental frequency are present on the series of inputs of the first, second and third reconfigurable input modules;

the DC/DC converter is further configured to arrange in series to one another the voltages present on the series of the inputs of the three series of first, second and third reconfigurable input modules, so as to cancel the three alternating components with double frequency with respect to the fundamental frequency that cancel one another out, maintaining the three direct components that are added and take a value equal to a voltage Vcc1 present at the input of the DC/DC converter;

the DC/DC converter is configured to produce three sums of the voltages at the ends of the first, second and third input windings, respectively connected to the outputs of the first, of the second and of the third input connection modules configured in operating mode and consequently not in bypass mode; the waveforms are compound and equal to those of the inputs of the respective modules during the direct connections, overturned during the reverse connections, and are spaced by 120° with respect to one another according to the control given by the control device;

the currents that flow through the input windings instead have square waveforms;

the three waveforms, sums of the voltages, with the contribution of the three waveforms of the currents respectively produce on the first output windings, on the second output windings and on the third output windings, voltages with a sinusoidal shape and spaced by 120° with respect to one another;

the control device is configured to control, for each reconfigurable output connection module belonging to the first, to the second and to the third plurality, a time span $T_{bypass}$ of the bypass connection that increases between a first module of the series towards the last module of the series, so that the total voltage present at the ends of the series of the outputs of the reconfigurable output modules comprises:
an alternating component that varies by reproducing a waveform with double frequency with respect to the fundamental and a residual noise; and
a direct component;
said converter is configured to arrange in series to one another the voltages present at the ends of the three series of first, second and third reconfigurable output connection modules, so as to cancel the double frequency alternating components that cancel one another out and maintain only the sum of the direct components that are added together, thus producing an almost steady output voltage Vcc2 at the converter.

4. The converter according to claim 1, wherein each reconfigurable connection module comprises:
a first pair of one-way electronic switches arranged in parallel to one another with opposite directions and interposed between a first output of a secondary and a first output terminal of the reconfigurable connection module;
a second pair of one-way electronic switches arranged in parallel to one another with opposite directions and interposed between the first outlet of the secondary and a second output terminal of the reconfigurable connection module;
a third pair of one-way electronic switches arranged in parallel to one another with opposite directions and interposed between a second output of the secondary and the first output terminal of the reconfigurable connection module; and
a fourth pair of one-way electronic switches arranged in parallel to one another with opposite directions and interposed between the second output of the secondary and the second output terminal of the reconfigurable connection module.

5. A method of control of an AC/DC converter comprising:
a three-phase transformer or three single-phase transformers defining a first primary winding, a second primary winding and a third primary winding;
a plurality of first secondary windings magnetically linked with the first primary winding, a plurality of second secondary windings magnetically linked with the second primary winding and a plurality of third secondary windings magnetically linked with the third primary winding;
a plurality of first, second and third reconfigurable connection modules each of which is respectively connected on the input side with a first, a second and a third secondary winding;
the outputs of the first reconfigurable connection modules being connected in series to one another, the outputs of the second reconfigurable connection modules being connected in series to one another and the outputs of the third reconfigurable connection modules being connected in series to one another;

the method comprising:
producing for each reconfigurable connection module:
a direct connection wherein the voltage supplied at the input of the reconfigurable connection module is transferred to its output with the same polarity;
a bypass connection wherein the output of the reconfigurable connection module is short-circuited and the output voltage at the module is substantially equal to zero; and
a reverse connection wherein the voltage supplied at the input of the reconfigurable connection module is transferred to its output with reversed polarity;
cyclically making, for each reconfigurable connection module and in successive instants, a direct connection, a bypass connection and a reverse connection;
controlling, for each connection module belonging to the first/to the second and to the third plurality, a time span of the bypass connection that increases between a first module of the series towards the last module of the series, so that the total voltage present at the ends of the series of modules that is given by the sum of the voltages present at the output of each reconfigurable connection module comprises:
an alternating component that varies by reproducing a waveform with double frequency with respect to the fundamental and a residual noise;
a direct component;
adding the voltages present at the ends of the three series of first, second and third modules in series so as to cancel the double frequency alternating components that cancel one another out and maintain only the sum of the direct components that are added together thus producing a smoothed output voltage at the converter.

6. A method of control of a DC/AC converter wherein a three-phase transformer or three single-phase transformers define a first primary winding, a second primary winding and a third primary winding;
- a plurality of first secondary windings are magnetically linked with the first primary winding, a plurality of second secondary windings are magnetically linked with the second primary winding and a plurality of third secondary windings are magnetically linked with the third primary winding;
- the DC/AC converter comprises a plurality of first, second and third reconfigurable connection modules each of which is respectively connected on the output side with a first, a second and a third secondary winding; the inputs of the first reconfigurable connection modules are connected in series to one another, the inputs of the second reconfigurable connection modules are connected in series to one another and the inputs of the third reconfigurable connection modules are connected in series to one another;
- the method comprising:
  - applying a DC voltage to be converted at the ends of the series of the inputs of the first, of the second and of the third reconfigurable connection modules;
  - producing for each reconfigurable module three connections according to the control of a control device:
    - a direct connection wherein the voltage Vi present at the input of the reconfigurable connection module is transferred to its output with the same polarity so as to supply the respective secondary winding;
    - a bypass connection wherein the input of the reconfigurable connection module is short-circuited, without supplying the respective secondary;
    - a reverse connection wherein the voltage $V_i$ present at the input of the reconfigurable connection module is transferred to its output with reversed polarity so as to supply the respective secondary winding with the voltage $-V_i$;
  - cyclically controlling, for each reconfigurable connection module, in successive instants, a direct connection, a bypass connection and a reverse connection;
  - controlling, for each reconfigurable connection module belonging to the first, to the second and to the third plurality of modules arranged in series, a time span of the bypass connection that increases between a first module of the series towards the last module of the series, so that a direct component and an alternating component with double frequency with respect to a fundamental frequency are present on the series of inputs of the first, second and third modules;
  - arranging in series to one another the voltages present on the series of the inputs of the three series of first, second and third modules, so as to cancel the three alternating components with double frequency with respect to the fundamental frequency that cancel one another out, maintaining the three direct components that are added together and take a value equal to the voltage to be converted;
    - producing on the outputs of the first, of the second and of the third modules configured in operating mode, i.e., not in bypass mode, sums of voltages with compound waveforms equal to those of the inputs during the direct connections and overturned during the reverse connections, spaced by 120° with respect to one another, and currents with square waveforms, which produce on the first primary winding, on the second primary winding and on the third primary winding voltages VT, VS and VR with sinusoidal shape and frequency equal to the fundamental frequency and spaced with respect to one another by 120°, and currents IT, IS and IR also with sinusoidal shape consistent with the respective voltages.

7. A method of control of a DC/DC converter comprising:
- a plurality of first, second and third reconfigurable input connection modules each of which is respectively connected on the output side with a respective first input winding, a respective second input winding and a respective third input winding; the inputs of the first reconfigurable input connection modules are connected in series to one another, the inputs of the second reconfigurable input connection modules are connected in series to one another and the inputs of the third reconfigurable input connection modules are connected in series to one another;
- the method comprises:
  - controlling the switches of each reconfigurable input module to make three connections:
    - a direct connection wherein the voltage Vi present at the input of the respective reconfigurable input connection module is transferred to its output with the same polarity so as to supply the respective input winding;
    - a bypass connection wherein the input of the reconfigurable connection module is short-circuited, without supplying the respective input winding;
    - a reverse connection wherein the voltage $V_i$ present at the input of the reconfigurable input connection module is transferred to its output with reversed polarity so as to supply the respective input winding with the voltage $-V_i$;
- said converter further comprises a plurality of first, second and third reconfigurable output connection modules, each of which is respectively connected on the input side with a respective first output winding, a respective second output winding and a respective third output winding;
- the outputs of the first reconfigurable output connection modules are connected in series to one another, the outputs of the second reconfigurable output connection modules are connected in series to one another and the outputs of the third reconfigurable output connection modules are connected in series to one another;
- the first input windings are magnetically coupled with the first output windings, the second input windings are magnetically coupled with the second output windings and the third input windings are magnetically coupled with the third output windings;
- controlling the switches of each reconfigurable output module to make three connections:
  - a direct connection wherein the voltage supplied at the input of the reconfigurable output connection is transferred to its output with the same polarity;
  - a bypass connection wherein the output of the reconfigurable output connection module is short-circuited and the output voltage at the module is substantially equal to zero;
  - a reverse connection wherein the voltage supplied at the input of the reconfigurable output connection module is transferred to its output with reversed polarity;
- the method comprises:
- controlling, for each input connection module belonging to the first/to the second and to the third plurality, a time span $T_{bypass}$ of the bypass connection that increases between a first module of the series towards the last module of the series, so that a direct component and an alternating component with double frequency with respect to a fundamental frequency are present on the series of inputs of the first, second and third reconfigurable input modules;

arranging in series to one another the voltages present on the series of inputs of the three series of first, second and third reconfigurable input modules, so as to cancel the three alternating components with double frequency with respect to the fundamental frequency that cancel one another out, maintaining the three direct components that are added together and take a value equal to a voltage Vcc1 present at the input of the converter DC/DC;

producing on the outputs of the first, of the second and of the third input modules configured in operating mode, i.e., not in bypass mode, sums of voltages with compound waveforms equal to those of the inputs during the direct connections and overturned during the reverse connections, spaced by 120° with respect to one another and currents with square waveforms, which respectively produce on the first output windings, on the second output windings and on the third output windings voltages with sinusoidal shape and spaced with respect to one another by 120°;

controlling, for each reconfigurable output connection module belonging to the first/to the second and to the third plurality, a time span $T_{bypass}$ of the bypass connection that increases between a first module of the series towards the last module of the series, so that the total voltage present at the ends of the outputs of the series of the reconfigurable output modules comprises:

an alternating component that varies by reproducing a double frequency waveform with respect to the fundamental and a residual noise; and a direct component;

adding the voltages present at the ends of the three series of first, second and third reconfigurable output connection modules in series so as to cancel the double frequency alternating components that cancel one another out and maintain only the sum of the direct components that are added together thus producing an almost steady output voltage at the DC/DC converter.

8. The converter according to claim 2, wherein each reconfigurable connection module comprises:
  a first pair of one-way electronic switches arranged in parallel to one another with opposite directions and interposed between a first output of a secondary and a first output terminal of the reconfigurable connection module;
  a second pair of one-way electronic switches arranged in parallel to one another with opposite directions and interposed between the first outlet of the secondary and a second output terminal of the reconfigurable connection module;
  a third pair of one-way electronic switches arranged in parallel to one another with opposite directions and interposed between a second output of the secondary and the first output terminal of the reconfigurable connection module; and
  a fourth pair of one-way electronic switches arranged in parallel to one another with opposite directions and interposed between the second output of the secondary and the second output terminal of the reconfigurable connection module.

9. The converter according to claim 3, wherein each reconfigurable connection module comprises:
  a first pair of one-way electronic switches arranged in parallel to one another with opposite directions and interposed between a first output of a secondary and a first output terminal of the reconfigurable connection module;
  a second pair of one-way electronic switches arranged in parallel to one another with opposite directions and interposed between the first outlet of the secondary and a second output terminal of the reconfigurable connection module;
  a third pair of one-way electronic switches arranged in parallel to one another with opposite directions and interposed between a second output of the secondary and the first output terminal of the reconfigurable connection module; and
  a fourth pair of one-way electronic switches arranged in parallel to one another with opposite directions and interposed between the second output of the secondary and the second output terminal of the reconfigurable connection module.

* * * * *